US012682755B2

(12) United States Patent
Kato

(10) Patent No.: US 12,682,755 B2
(45) Date of Patent: Jul. 14, 2026

(54) VEHICLE MANAGEMENT SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 293 days.

(21) Appl. No.: 18/533,940

(22) Filed: Dec. 8, 2023

(65) Prior Publication Data

US 2024/0203253 A1 Jun. 20, 2024

(30) Foreign Application Priority Data

Dec. 16, 2022 (JP) ................................. 2022-201654

(51) Int. Cl.
| | |
|---|---|
| *G08G 1/00* | (2006.01) |
| *B60L 58/13* | (2019.01) |
| *G08G 1/0967* | (2006.01) |
| *H04W 4/44* | (2018.01) |

(52) U.S. Cl.
CPC ........ *G08G 1/096775* (2013.01); *B60L 58/13* (2019.02); *G08G 1/202* (2013.01); *H04W 4/44* (2018.02); *B60L 2240/62* (2013.01); *B60L 2260/52* (2013.01)

(58) Field of Classification Search
CPC ............. B60L 2240/62; B60L 2260/52; B60L 2260/54; B60L 53/67; B60L 58/12; B60L 58/13; G01C 21/3407; G01C 21/3415; G01C 21/3605; G08G 1/096775; G08G 1/20; G08G 1/202
See application file for complete search history.

(56) References Cited

U.S. PATENT DOCUMENTS

2013/0261953 A1 * 10/2013 Kiyama ............. G01C 21/3469
                                                    701/400
2017/0074671 A1    3/2017 Yoshimura et al.

FOREIGN PATENT DOCUMENTS

JP        7285942 B2 *  6/2023  ........... G01C 21/343
WO    2016/006057 A1    1/2016

* cited by examiner

*Primary Examiner* — Charles J Han
(74) *Attorney, Agent, or Firm* — Rimon P.C.

(57) ABSTRACT

A vehicle management system includes electric vehicles and a server. The electric vehicles each include a first calculator and a navigator. The server includes a transceiver, a manager, a second calculator, and a charging processor. The manager is configured to manage group data of the electric vehicles traveling in a group. The second calculator is configured to calculate a traveling route along which a charging facility is set as a stopover point, based on a destination and cruising distances. The charging processor is configured to determine a charging priority of the electric vehicles traveling in the group when a traveling distance from a current position of one or more of the electric vehicles to the charging facility is within a predetermined traveling distance, and guide, to the charging facility, one or more of the electric vehicles chargeable at the charging facility, based on the determined charging priority.

4 Claims, 4 Drawing Sheets

VEHICLE MANAGEMENT SYSTEM

CROSS-REFERENCE TO RELATED APPLICATIONS

The present application claims priority from Japanese Patent Application No. 2022-201654 filed on Dec. 16, 2022, the entire contents of which are hereby incorporated by reference.

BACKGROUND

The disclosure relates to a vehicle management system.

A vehicle such as an electric vehicle or a plug-in hybrid vehicle having a storage battery chargeable by an external power source has become popular in recent years from a viewpoint of environmental protection.

In order to enjoy long-distance driving by the vehicle such as the electric vehicle, it may sometimes be necessary to charge the storage battery. However, because a place and the number of charging facilities are limited, it is necessary to charge each of electric vehicles efficiently when, for example, the electric vehicles travels in a group.

For example, International Publication No. WO/2016/006057 discloses the following technique related to usage of a charging facility upon group traveling. The technique, upon the group traveling of electric vehicles that travel toward the same destination, causes each of the electric vehicles to share a vehicle state such as a remaining storage battery amount by communication, and guides each of the electric vehicles to a corresponding charging facility at an optimum timing by navigation and server data, to thereby allow all the electric vehicles to efficiently arrive at the destination.

SUMMARY

An aspect of the disclosure provides a vehicle management system that includes electric vehicles and a server. The electric vehicles each include a first calculator and a navigator. The first calculator is configured to calculate a distance in which an own electric vehicle out of the electric vehicles is able to cruise, based on a remaining charge amount of the own electric vehicle, in which the distance in which the own electric vehicle is able to cruise is a cruising distance. The navigator is configured to provide a guidance on a traveling route from the own electric vehicle to a charging facility and a destination. The server is communicably coupled to each of the electric vehicles and includes a transceiver, a manager, a second calculator, and a charging processor. The transceiver is configured to transmit and receive data on the traveling route. The manager is configured to manage group data of the electric vehicles traveling in a group. The second calculator is configured to calculate the traveling route along which the charging facility is set as a stopover point, based on the destination and the cruising distances. The charging processor is configured to determine a charging priority of the electric vehicles traveling in the group when a traveling distance from a current position of one or more of the electric vehicles traveling in the group to the charging facility set as the stopover point is within a predetermined traveling distance, and guide, to the charging facility, one or more of the electric vehicles traveling in the group and chargeable at the charging facility, based on the determined charging priority.

An aspect of the disclosure provides a vehicle management system that includes electric vehicles and a server. The electric vehicles each include first circuitry and a navigator. The first circuitry is configured to calculate a distance in which an own electric vehicle out of the electric vehicles is able to cruise, based on a remaining charge amount of the own electric vehicle, in which the distance in which the own electric vehicle is able to cruise is a cruising distance. The navigator is configured to provide a guidance on a traveling route from the own electric vehicle to a charging facility and a destination. The server is communicably coupled to each of the electric vehicles and includes a transceiver and second circuitry. The transceiver is configured to transmit and receive data on the traveling route. The second circuitry is configured to manage group data of the electric vehicles traveling in a group, calculate the traveling route along which the charging facility is set as a stopover point, based on the destination and the cruising distances, and determine a charging priority of the electric vehicles traveling in the group when a traveling distance from a current position of one or more of the electric vehicles traveling in the group to the charging facility set as the stopover point is within a predetermined traveling distance, and guide, to the charging facility, one or more of the electric vehicles traveling in the group and chargeable at the charging facility, based on the determined charging priority.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
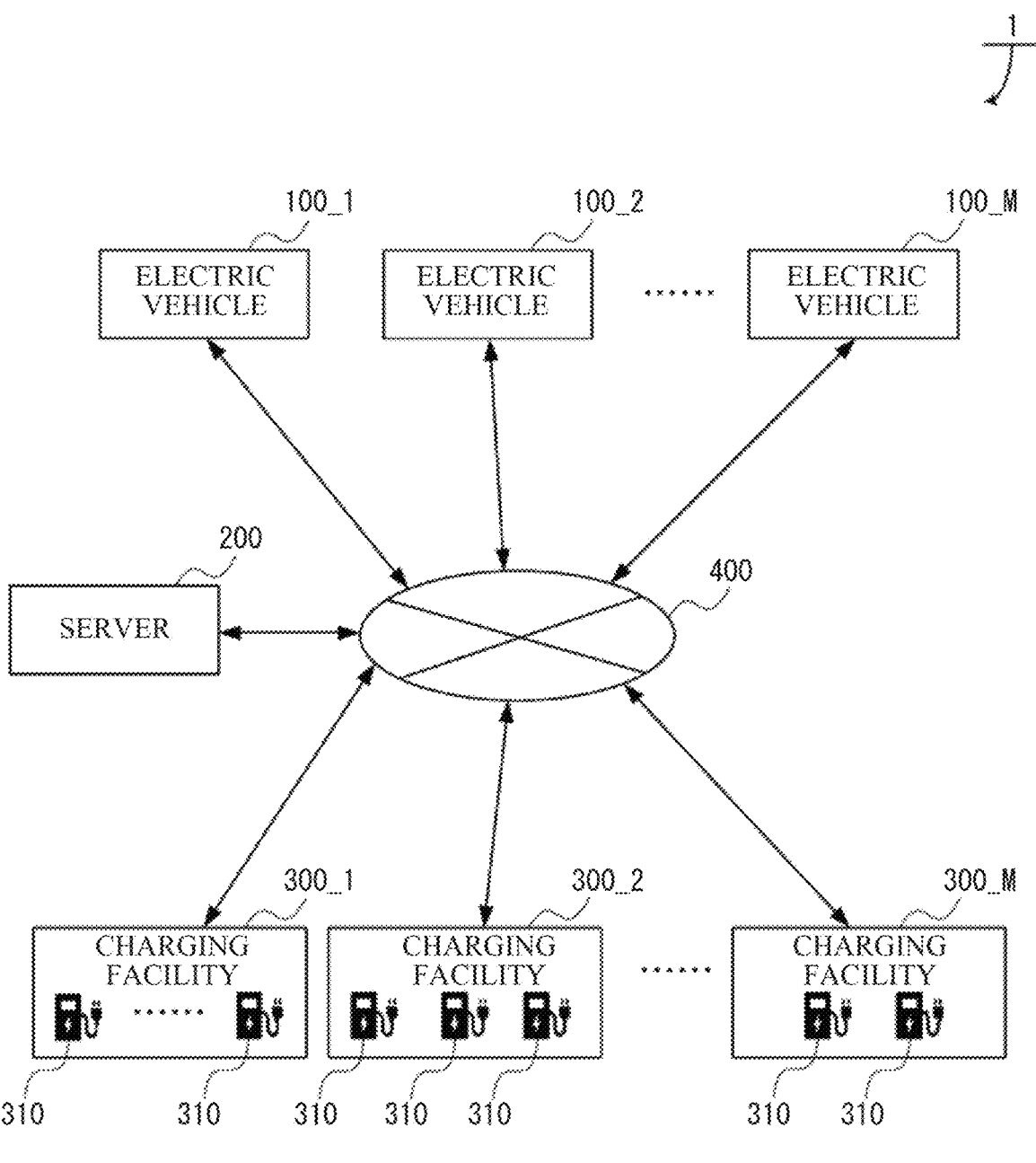
FIG. 1 is a diagram illustrating a configuration of a vehicle management system according to one example embodiment of the disclosure.

A technique disclosed in International Publication No. WO/2016/006057 has the following concern. For example, when it is not possible for all vehicles traveling in a group to use chargers in the same charging facility due to a state of usage of the charging facility set as a stopover point, it is necessary for all the vehicles to wait at the charging facility until charging of all the vehicles is completed.

It is desirable to provide a vehicle management system that allows all vehicles, e.g., electric vehicles, traveling in a group to efficiently arrive at a destination.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A vehicle management system 1 according to an example embodiment will be described with reference to FIGS. 1 to 4.

[Configuration of Vehicle Management System 1]

Referring to FIG. 1, the vehicle management system 1 according to the example embodiment may include: electric vehicles 100_1 to 100_M; a server 200; charging facilities 300_1 to 300_N; and a network 400. In one embodiment, the electric vehicles 100_1 to 100_M each may serve as an "own vehicle".

In the following description, the electric vehicles 100_1 to 100_M may be collectively referred to as an "electric vehicle 100", and the charging facilities 300_1 to 300_N may be collectively referred to as a "charging facility 300".

The electric vehicle 100 may include a storage battery chargeable by an external power source, and charge the storage battery using a charger 310 provided at the charging facility 300.

The electric vehicle 100 is not limited to a four-wheel vehicle, and may be any vehicle, such as a two-wheel vehicle, that travels by electric power of a rechargeable battery.

The server 200 may be communicably coupled to the electric vehicle 100 and the charging facility 300 via the network 400.

The charging facility 300 may include the multiple chargers 310. The charging facility 300 may transmit, to the server 200, data on a current usage state of the chargers 310 and a current reservation state of the chargers 310.

The network 400 may be any network adapted for a communication between multiple devices. The network 400 may be, for example but not limited to, an Internet network.

The example configurations of the electric vehicle 100 and the server 200 will be described later.

[Configuration of Electric Vehicle 100]

Figure 2:
FIG. 2 is a diagram illustrating a configuration of an electric vehicle illustrated in FIG. 1.
Figure 2:
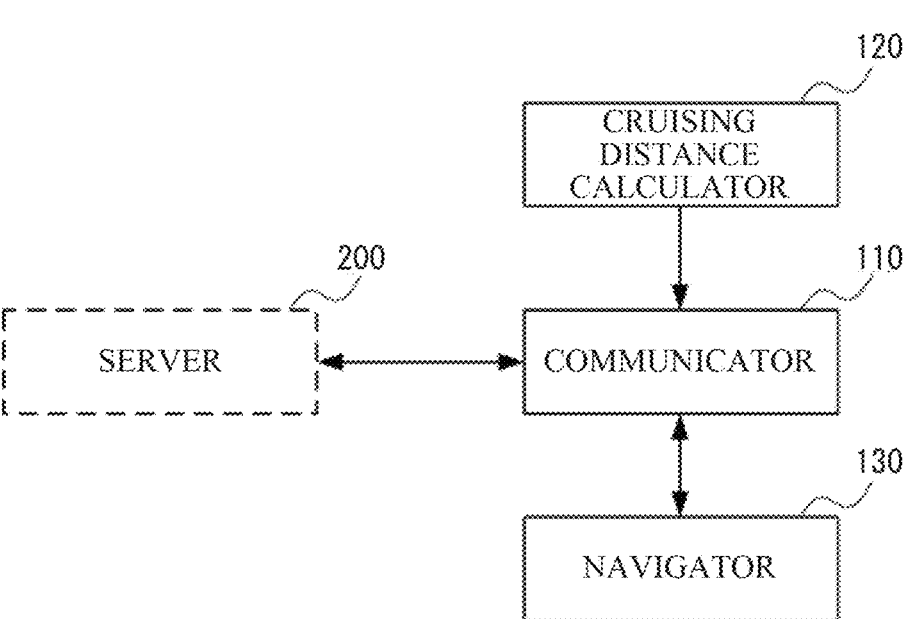

Referring to FIG. 2, the electric vehicle 100 includes a cruising distance calculator 120 and a navigator 130. The electric vehicle 100 may also include a communicator 110.

The communicator 110 may be, for example, any known wireless communication module. The communicator 110 may serve as an interface for the electric vehicle 100 to communicate with the server 200 via the network 400.

The cruising distance calculator 120 calculates a distance in which the electric vehicle 100 is able to cruise, based on a remaining charge amount of the electric vehicle 100. As used herein, the distance in which the electric vehicle 100 is able to cruise may be referred to as a "cruising distance". In one embodiment, the cruising distance calculator 120 may serve as a "first calculator".

For example, the cruising distance calculator 120 may calculate the cruising distance, based on the remaining charge amount of the storage battery of the electric vehicle 100 and an actual value of an AC power consumption rate. The AC power consumption rate may correspond to a traveling distance per external charging amount of 1 kwh. The cruising distance calculator 120 may transmit a result of the calculation to the server 200 via the communicator 110.

It should be note that the method of calculating the cruising distance described above is non-limiting. Any method of calculating the cruising distance may be employed as long as the cruising distance of the electric vehicle 100 is calculatable.

The navigator 130 provides a guidance on a traveling route from the electric vehicle 100 to the charging facility 300 and a destination.

For example, the navigator 130 may provide the guidance on the traveling route from the electric vehicle 100 to the charging facility 300 and the destination, based on a traveling route, received from the server 200, along which the charging facility 300 is set as a stopover point.

The navigator 130 may acquire a current position of the electric vehicle 100 from an unillustrated GPS receiver, and transmit data on the acquired current position to the server 200.

The navigator 130 may transmit, to the server 200, data on the destination inputted by an occupant of the electric vehicle 100. Non-limiting examples of the data on the destination may include facility name and a position of the destination.

[Configuration of Server 200]

Figure 3:
FIG. 3 is a diagram illustrating a configuration of a server illustrated in FIG. 1.
Figure 3:
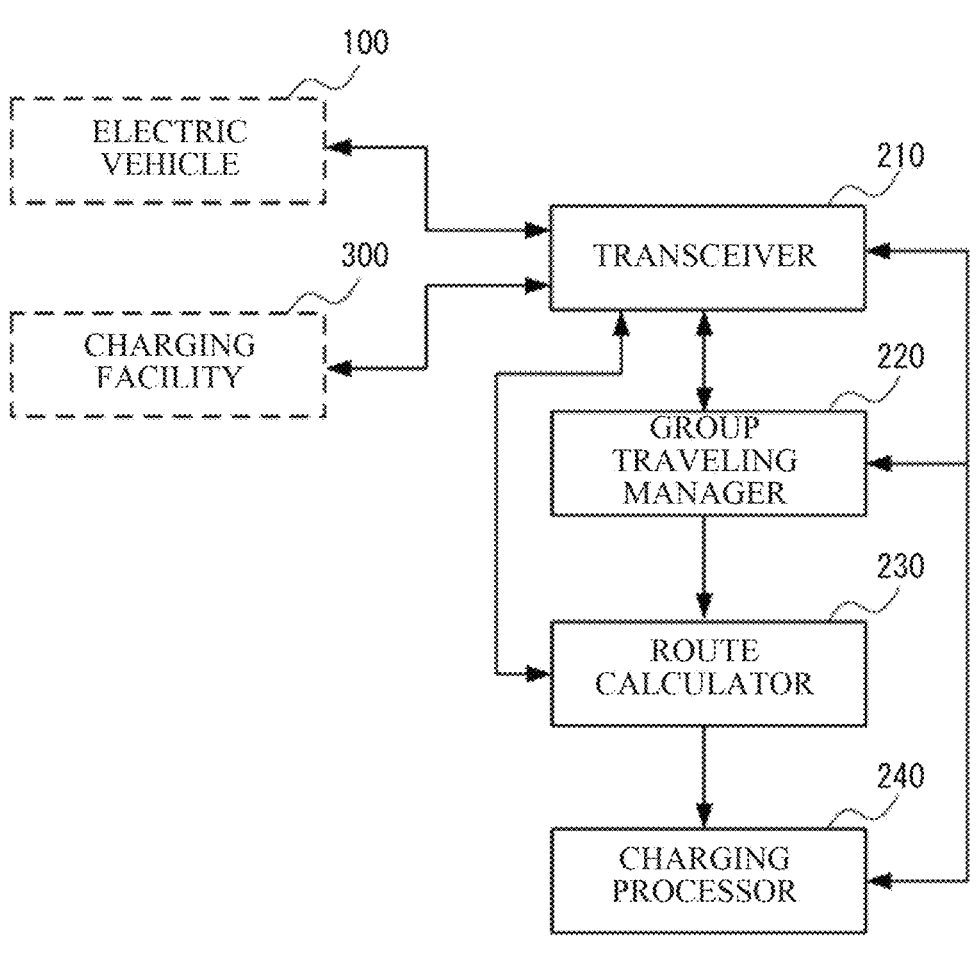

Referring to FIG. 3, the server 200 includes a transceiver 210, a group traveling manager 220, a route calculator 230, and a charging processor 240.

The transceiver 210 transmits and receives data on the traveling route.

For example, the transceiver 210 may be coupled to the electric vehicles 100 managed by the later-described group traveling manager 220, and transmit and receive the data on the traveling route when the electric vehicles 100 travel in a group.

As used herein, the term "travel in a group", i.e., "group traveling", means that the multiple electric vehicles 100 travel together toward the same destination.

Non-limiting examples of the data on the traveling route may include data on the destination, data on the cruising distance of each of the electric vehicles 100 performing the group traveling, data on a current position of each of the electric vehicles 100 performing the group traveling, and the data on traveling route calculated by the later-described route calculator 230.

The group traveling manager 220 manages group data of the electric vehicles 100 performing the group traveling. In one embodiment, the group traveling manager 220 may serve as a "manager".

Hereinafter, an example of the group data to be managed by the group traveling manager 220 and a method of managing the group data will be described.

When starting the group traveling, the leader who organizes the group traveling may input data such as a group ID of a traveling group by using, for example, the navigator 130, to register a group.

The navigator 130 may transmit, to the group traveling manager 220, inputted data including, for example, the group ID, data on a registrant, and data on the destination of the group. The group traveling manager 220 may store the received data in an unillustrated memory.

A participant of the group traveling may input data including, for example, the group ID registered by the leader and data on the participant by using the navigator 130, to register participation in the traveling group.

The navigator 130 may transmit data including, for example, the inputted group ID and data on the participant to the group traveling manager 220. The group traveling manager 220 may collate the received group ID with the group ID stored in the memory. The group traveling manager 220 may approve participation in the group when the received group ID matches with any group ID stored in the memory, and store the participant data in the memory in association with the group ID.

The group travel manager 220 may store, for each registered group ID, the group data including, for example, the participant data, the destination data, the traveling route data, and data on the stopover point.

It should be note that the group data and the method of managing the group data described above are non-limiting. Any group data and any method of managing the group data may be employed as long as the group traveling manager 220 is able to manage the pieces of group data of the respective electric vehicles 100 that travel toward the same destination.

The route calculator 120 calculates the traveling route along which the charging facility 300 is set as the stopover point, based on the destination and the cruising distances. In one embodiment, the route calculator 120 may serve as a "second calculator".

For example, the route calculator 230 may compare the cruising distance with the traveling distance from the current position to the destination that are received from each of the electric vehicles 100 traveling in the group. When any of the electric vehicles 100 is detected that is unable to or difficult to reach the destination unless the charging is performed, the route calculator 230 may calculate the traveling route along which the charging facility 300 is set as the stopover point.

The route calculator 230 may refer to data on the number of chargers 310 provided in each of the charging facilities 300 stored in the unillustrated memory, for example. The route calculator 230 may set, as the stopover point, the charging facility 300 that has the number of chargers 310 equal to or greater than the number of electric vehicles 100 to be charged.

In some embodiments, when there is no charging facility 300 that has the number of chargers 310 equal to or greater than the number of electric vehicles 100 to be charged in the vicinity of the traveling route toward the destination, the route calculator 230 may calculate a traveling route along which the multiple charging facilities 300 positioned within a range of the cruising distance are set as the respective stopover points.

The route calculator 230 may transmit data on the calculated traveling route to the group traveling manager 220, the later-described charging processor 240, and the electric vehicles 100 that travel in the group. Non-limiting examples of the data on the calculated traveling route may include data on the traveling route and data on the stopover point.

The charging processor 240 may control an operation of the server 200 as a whole in accordance with a control program stored in an unillustrated storage such as a read only memory (ROM).

In the example embodiment, when the traveling distance from the current positions of the electric vehicles 100 traveling in the group to the charging facility 300 set as the stopover point is within a predetermined traveling distance, the charging processor 240 determines a charging priority of the electric vehicles 100 traveling in the group, and guide, to the charging facility 300, the number of electric vehicles 100 traveling in the group and chargeable at the charging facility 300, based on the determined charging priority.

For example, the charging processor 240 may calculate a traveling distance from each of the electric vehicles 100 to the charging facility 300 based on the data on the current position received from each of the electric vehicles 100, and determine whether there is any electric vehicle 100 that has approached the charging facility 300 within the predetermined traveling distance.

The term "predetermined traveling distance" may refer to any distance, as long as the charging processor 240 is able to determine whether the electric vehicles 100 traveling in the group have sufficiently approached the charging facility 300. For example, the "predetermined traveling distance" may be 1 km, although it is not limited thereto.

When the charging processor 240 determines that there is any electric vehicle 100 that has approached the charging facility 300 within the predetermined traveling distance, the charging processor 240 may determine the charging priority of the electric vehicles 100 to be charged at the charging facility 300 set as the stopover point, based on the current cruising distance received from each of the electric vehicles 100.

In some embodiments, the charging processor 240 may determine that the charging priority is high in the order, from the shortest to the longest, of the current cruising distances received from the respective electric vehicles 100.

In some embodiments, when any of the electric vehicle 100 has sufficiently approached the charging facility 300, the charging processor 240 may determine the electric vehicle 100 to be guided to the charging facility 300, based on the determined charging priority and a usage status of the charging facility 300 set as the stopover point.

For example, when the current available number of chargers 310, or the number of unused chargers 310, of the charging facility 300 set as the stopover point is three, the charging processor 240 may determine three electric vehicles 100 in descending order of the charging priority as the electric vehicles 100 to be charged at the charging facility 300.

The charging processor 240 may transmit, to the navigator 130 of the electric vehicle 100, an instruction to execute voice guidance such as "please charge at the charging facility 300", for example, to the electric vehicle 100 determined to be subjected to the charging at the charging facility 300 set as the stopover point, based on the priority of charging, and guide the electric vehicle 100 to the charging facility 300.

The charging processor 240 may determine whether the electric vehicle 100, determined to be unable to or difficult to reach the destination unless the charging is performed at the time when the route calculator 230 has calculated the traveling route, is successfully guided to the charging facility 300 set as the stopover point.

In some embodiments, when there is any electric vehicle 100 unguided to the charging facility 300 based on the charging priority and the usage status of the charging facility 300 set as the stopover point, the charging processor 240 may acquire, from the route calculator 230, the traveling route along which the new charging facility 300 is set as the stopover point, and transmit the acquired traveling route to the electric vehicle 100.

When the charging processor 240 determines that the charging facility 300 does not exist within a range of the cruising distance of the electric vehicle 100 unguided to the charging facility 300 set as the stopover point, the charging processor 240 may guide the electric vehicle 100 to the charging facility 300 set as the stopover point in the initial traveling route.

When the charging processor 240 transmits the new traveling route to the electric vehicle 100, the charging processor 240 may transmit, to the navigator 130 of the electric vehicle 100, an instruction to execute a voice guidance such as "guiding the traveling route along which the new charging facility is set as the stopover point", for example.

In order to allow data to be shared between the occupants of the electric vehicles 100 traveling in the group, the charging processor 240 may transmits data on the new traveling route to the electric vehicles 100 that perform the charging at the charging facility 300. Non-limiting examples of the data on the new traveling route may include data on the electric vehicles 100 unable to be charged, data on the new charging facility, data on the new traveling route, the current position of each of the electric vehicles 100, and the cruising distance of each of the electric vehicles 100.

[Process of Vehicle Management System 1]

Figure 4:
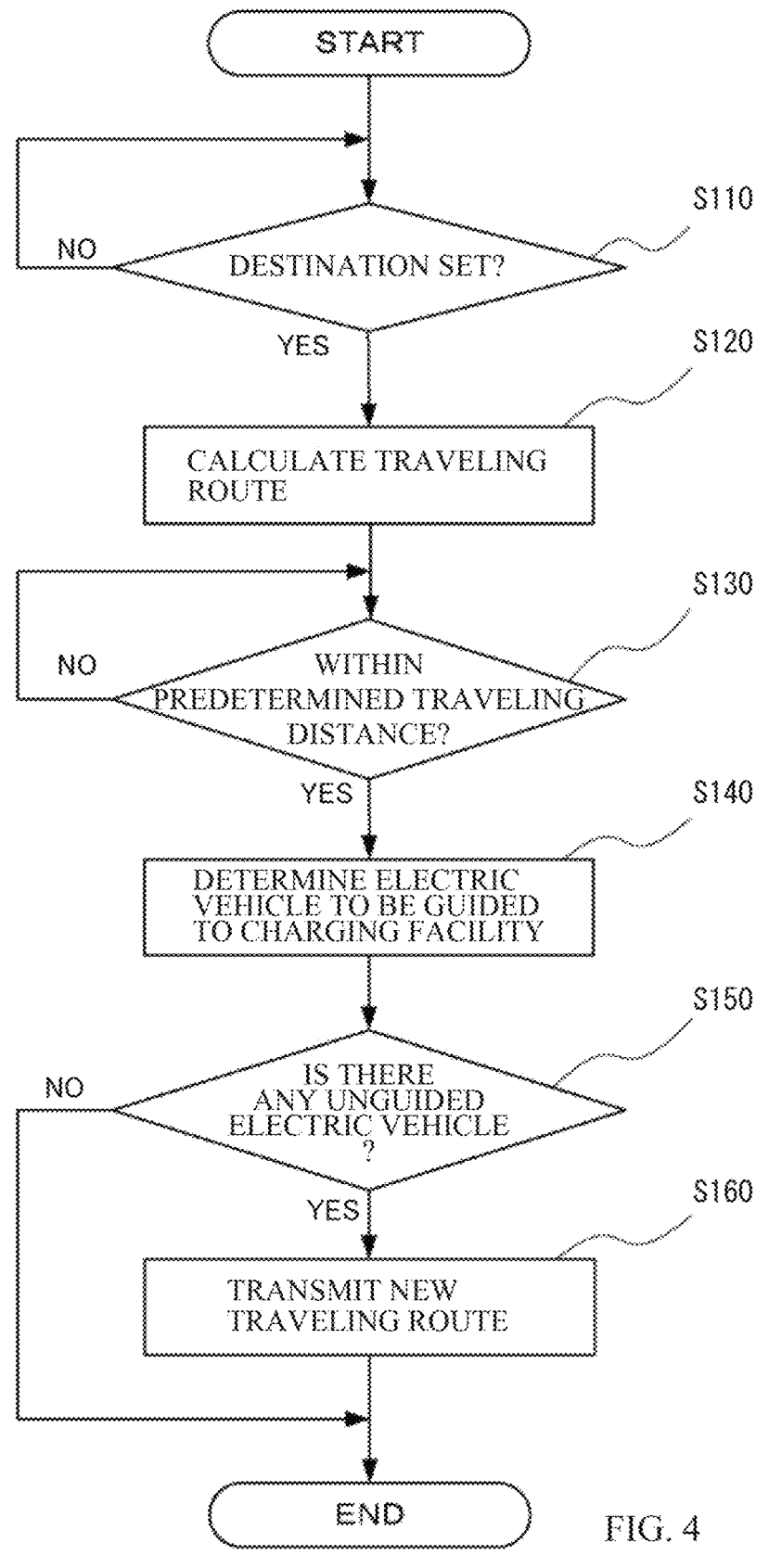
FIG. 4 is a flowchart illustrating a process to be performed by the vehicle management system illustrated in FIG. 1.

An example process to be performed by the vehicle management system 1 will be described with reference to FIG. 4.

The navigator 130 may determine whether the leader of the group traveling has set the destination (step S110).

If the navigator 130 determines that the leader of the group traveling has not set the destination ("NO" in step S110), the navigator 130 may return the process and shift to a standby state.

If the navigator 130 determines that the leader of the group traveling has set the destination ("YES" in step S110), the route calculator 230 may calculate the traveling route along which the charging facility 300 is set as the stopover point, and transmit the calculated traveling route to the electric vehicles 100 that travel in the group (step S120).

The charging processor 240 may determine whether the traveling distance from the current positions of the respective electric vehicles 100 traveling in the group to the charging facility 300 is within the predetermined traveling distance (step S130).

The charging processor 240 may return the process to step S130 and shift to the standby mode when the charging processor 240 determines that the traveling distance from the current positions of the respective electric vehicles 100 to the charging facility 300 is not within the predetermined traveling distance ("NO" in step S130).

If the charging processor 240 determines that the traveling distance from the current positions of the respective electric vehicles 100 traveling in the group to the charging facility 300 is within the predetermined traveling distance ("YES" in step S130), the charging processor 240 may determine the electric vehicles 100 to be charged at the charging facility 300 based on the charging priority and the usage status of the charging facility 300, and guide the thus-determined electric vehicles 100 to the charging facility 300 (step S140).

The charging processor 240 may determine whether there is any electric vehicle 100 unguided to the charging facility 300 set as the stopover point, based on the charging priority and the usage status of the charging facility 300 (step S150).

If the charging processor 240 determines, based on the charging priority and the usage status of the charging facility 300, that there is no electric vehicle 100 unguided to the charging facility 300 set as the stopover point ("NO" in step S150), the charging processor 240 may end the process.

For example, the charging processor 240 may end the process without changing the traveling route currently set for the electric vehicles 100.

If the charging processor 240 determines, based on the charging priority and the usage status of the charging facility 300, that there is any electric vehicle 100 unguided to the charging facility 300 set as the stopover point ("YES" in step S150), the charging processor 240 may transmit, to the electric vehicles 100, the traveling route along which the new charging facility 300 is set as the stopover point (step S160), and end the process.

Workings and Example Effects

The vehicle management system 1 according to the example embodiment determines the charging priority of the electric vehicles 100 traveling in the group when the traveling distance from the current position of one or more of the electric vehicles 100 traveling in the group to the charging facility 300 set as the stopover point is within the predetermined traveling distance, and guides one or more of the electric vehicles traveling in the group and chargeable at the charging facility 300 to the charging facility 300, based on the determined charging priority.

In some embodiments, the vehicle management system 1 may determine the electric vehicles 100 to be guided to the charging facility 300, based on the charging priority determined based on the cruising distance of each of the electric vehicles 100 and the current usage status of the charging facility 300, e.g., the number of available chargers 310.

Thus, the electric vehicle 100 with the short cruising distance is preferentially charged, which helps to prevent the electric vehicle 100 from becoming unable to or difficult to travel due to running out of electric power.

In some embodiments, when there is any electric vehicle 100 unable to be charged at the charging facility 300 based on the charging priority and the usage status of the charging facility 300 set as the stopover point, the vehicle management system 1 may transmit data on a traveling route, calculated by the route calculator 230, along which the new charging facility 300 is set as the stopover point.

Even if the electric vehicles 100 that are greater in number than the number of chargers 310 currently available at the charging facility 300 are guided to the charging facility 300, a waiting time for charging occurs. Accordingly, for the electric vehicle 100 unguided to the charging facility 300, the vehicle management system 1 may reset the traveling route along which the new charging facility 300 is set as the stopover point and guide the electric vehicle 100 to the new charging facility 300.

This eliminates an useless waiting time for charging, which helps to allow all vehicles, e.g., the electric vehicles, traveling in a group to efficiently arrive at a destination.

In some embodiments, when there is any electric vehicle 100 unable to be charged at the charging facility 300 set as the stopover point, the vehicle management system 1 may transmit, to each of the electric vehicles 100, data on the traveling route along which the new charging facility 300 is set as the stopover point. Non-limiting examples of the data on the traveling route along which the new charging facility 300 is set as the stopover point may include data on the electric vehicle 100 unable to be charged, data on the new charging facility, data on the new traveling route, data on the current position of each of the electric vehicles 100, and the cruising distance of each of the electric vehicles 100.

This configuration allows for understanding of situations of the electric vehicles 100 participating in the group traveling with respect to one another, which helps to allow drivers who drive the respective electric vehicles 100 to concentrate on driving to the destination without anxiety.

MODIFICATION EXAMPLES

In some embodiments, the navigator 130 included in the electric vehicle 100 of the vehicle management system 1 according to the example embodiment may be a smartphone carried by an occupant of the electric vehicle 100.

For example, the smartphone carried by the occupant may be coupled to the server 200 via the network 400, and the smartphone may be used to perform, for example, the registration with the group traveling manager 220, the acquisition of the data on the current position, and the guidance of the traveling route.

In some embodiments, it is possible to implement the server 200 of the example embodiment of the disclosure by recording the process to be executed by a processor such as the group traveling manager 220, the route calculator 230, and the charging processor 240 on a non-transitory recording medium readable by a computer system, and causing the computer system to load the program recorded on the non-transitory recording medium onto the processor such as the group traveling manager 220, the route calculator 230, and the charging processor 240 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the cruising distance calculator 120, the group traveling manager 220, the route calculator 230, and the charging processor 240 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the cruising distance calculator 120, the group traveling manager 220, the route calculator 230, and the charging processor 240. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the cruising distance calculator 120, the group traveling manager 220, the route calculator 230, and the charging processor 240 illustrated in FIGS. 2 and 3.

The invention claimed is:

1. A vehicle management system comprising:
   electric vehicles, each electric vehicle comprising
   at least one first processor and at least one non-transitory first memory storing a program that, when executed by the at least one first processor, causes the at least one first processor to:
      calculate a cruising distance of a respective electric vehicle based on a remaining charge amount of the respective electric vehicle; and
   provide a guidance on a traveling route from the respective electric vehicle to a charging facility and a destination; and
      a server that is communicably coupled to each of the electric vehicles and comprises;
      a transceiver configured to transmit and receive data on the traveling route, the data on the traveling route including at least a destination and the cruising distance of the respective electric vehicle; and
      at least one second processor and at least one non-transitory second memory storing a program that, when executed by the at least one second processor, causes the at least one second processor to:
         manage group data of the electric vehicles traveling together as a group, the group data including at least members of the group;
         calculate the traveling route along which the charging facility is set as a stopover point, based on the data on the traveling route;
         determine that a traveling distance from a current position of one or more of the electric vehicles traveling in the group to the charging facility set as the stopover point is within a predetermined traveling distance;
         in response to determining that the traveling distance is within the predetermined traveling distance, determine a charging priority of the electric vehicles traveling in the group;
      select, based on the determined charging priority and a usage status of the charging facility set as the stopover point, one or more of the electric vehicles traveling in the group and chargeable at the charging facility; and
      guide, to the charging facility, the selected one or more of the electric vehicles, based on the determined charging priority.

2. The vehicle management system according to claim 1, wherein the at least one second processor is caused to determine the one or more of the electric vehicles to be guided to the charging facility, based on the charging priority and a usage status of the charging facility.

3. The vehicle management system according to claim 2, wherein the at least one second processor is caused to transmit, via the transceiver to one or more of the electric vehicles unguided to the charging facility, data on the traveling route, calculated by the at least one second processor, along which a new charging facility is set as the stopover point.

4. A vehicle management system comprising:

electric vehicles, each electric vehicle comprising first circuitry configured to:

calculate a cruising distance of a respective electric vehicle based on a remaining charge amount of the respective electric vehicle; and cause a navigator to provide a guidance on a traveling route from the respective electric vehicle to a charging facility and a destination; and a server that is communicably coupled to each of the electric vehicles and comprises second circuitry configured to:

cause a transceiver to transmit and receive data on the traveling route, the data on the traveling route including at least a destination and the cruising distance of the respective electric vehicle;

manage group data of the electric vehicles traveling together as a group, the group data including at least members of the group;

calculate the traveling route along which the charging facility is set as a stopover point, based on the data on the traveling route;

determine that a traveling distance from a current position of one or more of the electric vehicles traveling in the group to the charging facility set as the stopover point is within a predetermined traveling distance;

in response to determining that the traveling distance is within the predetermined traveling distance, determine a charging priority of the electric vehicles traveling in the group;

select, based on the determined charging priority and a usage status of the charging facility set as the stopover point, one or more of the electric vehicles traveling in the group and chargeable at the charging facility; and guide, to the charging facility, the selected one or more of the electric vehicles, based on the determined charging priority.

* * * * *